E. Wassell,
Horseshoe Machine.
N° 100,570. Patented Mar. 8, 1870.

Witnesses:
A. C. Johnston
Jas. G. Thompson

Inventor:
Edwin Wassell.
By his Attorney
A. C. Johnston.

E. Wassell,
Horseshoe Machine.
Nº 100,570. Patented Mar. 8, 1870.
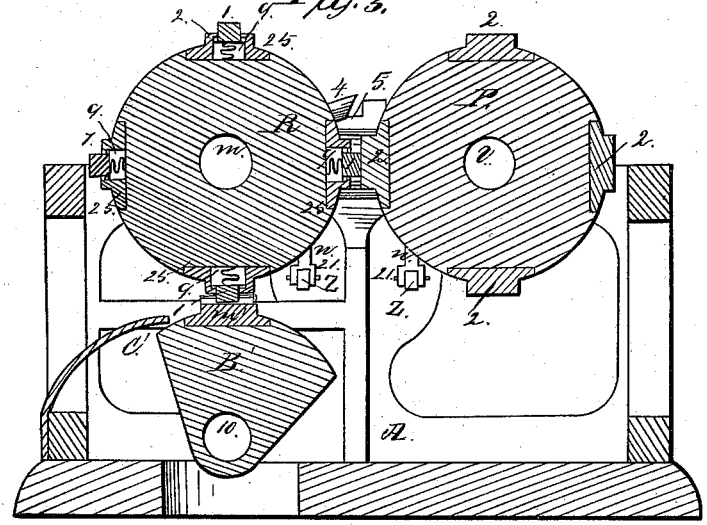
Fig: 3.
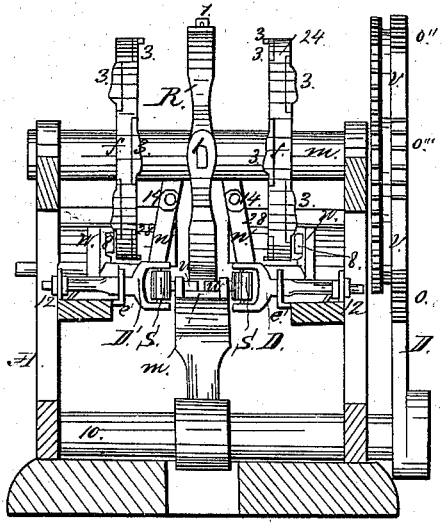
Fig: 4.
Witnesses:
A. C. Johnston
Jas. G. Thompson
Inventor:
Edwin Wassell.
By his Attorney
L. L. Johnston.

E. Wassell,
Horseshoe Machine.
Nº 100,570. Patented Mar. 8, 1870.
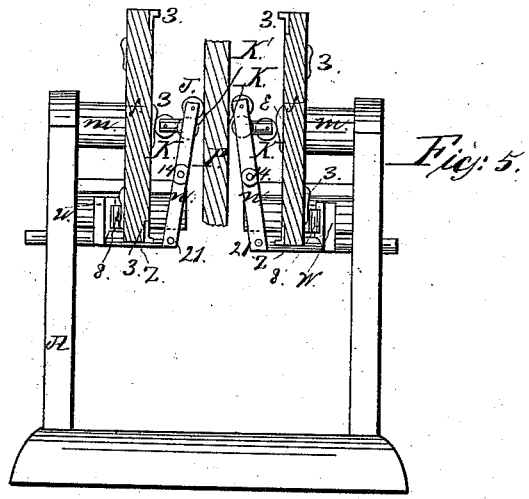
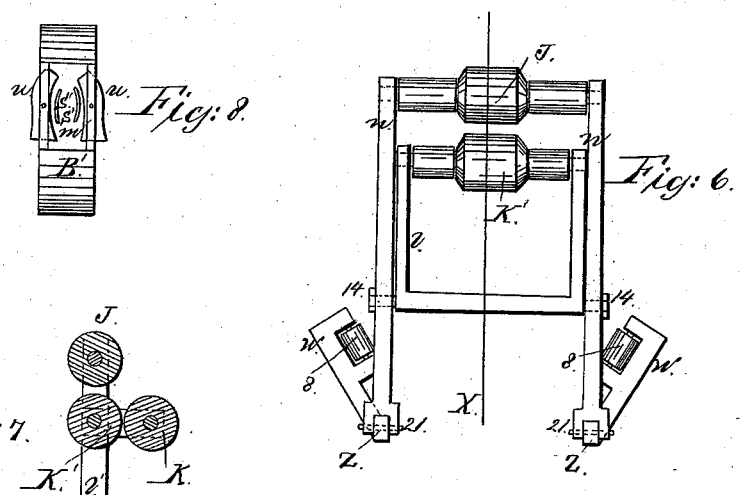
Witnesses:
A. C. Johnston
Jas. G. Thompson
Inventor:
Edwin Wassell By
Attorney A. C. Johnston

United States Patent Office.

EDWIN WASSELL, OF WOOD'S RUN, PENNSYLVANIA.

Letters Patent No. 100,570, dated March 8, 1870.

IMPROVED MACHINE FOR MAKING HORSESHOES.

The Schedule referred to in these Letters Patent and making part of the same.

*To all whom it may concern:*

Be it known that I, EDWIN WASSELL, of Wood's Run, in the county of Allegheny, and State of Pennsylvania, have invented a certain new and useful Improvement in Horseshoe-Machines; and I do hereby declare that the following is a full, clear, and exact description thereof, reference being had to the accompanying drawings and to the letters and figures of reference marked thereon.

The nature of my invention consists in arranging on a wheel or disk, a series of yielding dies, corresponding to the form of the horseshoe desired, and in combination with said dies a series of rollers, operated by cams arranged on wheels or disks, said dies, rollers, and cams so operating upon the iron which forms the horseshoes as to bend it closely to the dies.

My invention also consists in combining with said yielding dies a grooving-die, so arranged and operating with relation to them as to press and clamp the outer edges of the horseshoes while being grooved, and then discharge them from the machine in a finished condition.

To enable others skilled in the art to make and use my invention, I will proceed to describe more fully its construction and operation.

In the accompanying drawings, which form part of my specification—

Figure 3 is a vertical and longitudinal section of the same, at line $y$ of fig. 2.

Figure 4 is an end view of the same, with a portion of the frame removed, as indicated at line $y'$ in fig. 2.

Figure 5 is a transverse section of the same, when cut through at line $y''$ of fig. 2.

Figure 6 is a front view of the frames and rollers used for pressing the iron against the yielding dies.

Figure 7 is a vertical section of the same, when cut through at line $x$ of fig. 6.

Figure 8 is a top view of the grooving-die.

In the accompanying drawing—

A represents the frame of machine.

B and C, the driving-wheels, which are secured on shafts $l$ and $m$.

Figure 1:
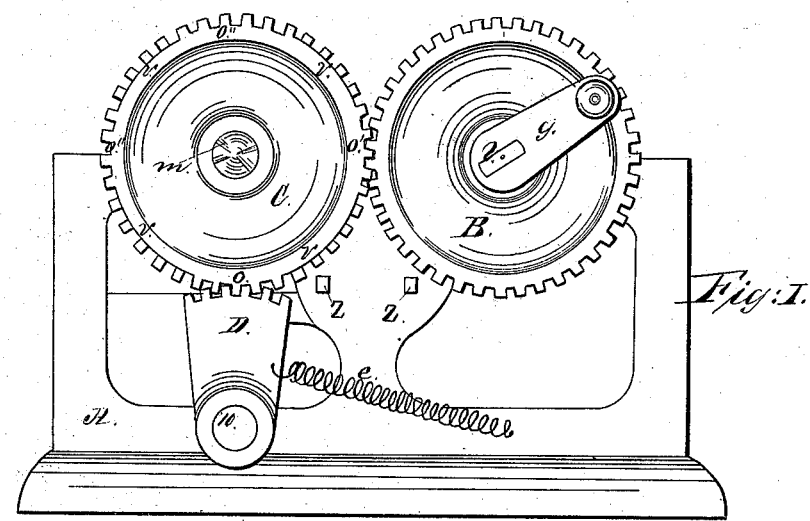
Figure 1 is a side elevation of my improvement in horseshoe-machines.
Figure 2:
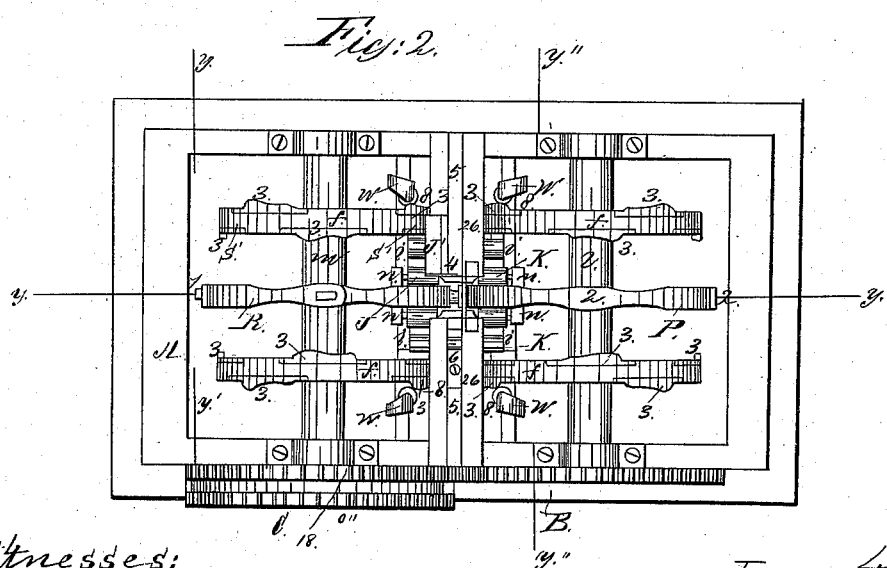
Figure 2 is a top view or plan of the same.

The teeth of wheels B gear into the teeth 18 of the wheel C, which is also provided with four series of teeth, marked O, O', O", and O"', and four blank spaces, V, which are so arranged with relation to the teeth O, O', O", and O"', as to leave a blank space between each series of teeth, as shown in fig. 1.

The teeth O, O', O", and O"', gear into the teeth on the sector D on the end of shaft 10, upon which is secured a sector, B', on which are secured the grooving-die $m$ and the clamps $u$, which press and hold the outer edge of the shoe while being grooved or creased by the projections S' on the face of the die $m'$, (see fig. 8.)

The teeth O, O', O", and O"', and the blank spaces V are arranged with relation to the yielding dies 1 in periphery of the wheel R, and the projecting dies 2 on the periphery of the wheel P, so that they will gear into the teeth on sector D at suitable intervals, and in conjunction with the spring $e$, impart a reciprocating motion to the sector B', and the die $m'$ and clamp $u$, so that the reciprocating movements of the grooving-die $m'$ will be in harmony with the movements of wheels R and P, and the dies 1 and 2 arranged thereon.

The dies 1 correspond to the form of the opening in the horseshoe, and are held out in their working-position by the springs 9 placed under them and in the cavity in the pieces marked 25, the arrangement of which is clearly shown in fig. 3 of Sheet B.

On each side of the wheels R and P, on a line where the faces of the dies 1 and 2 meet each other, and directly under the grooves 5 in the pieces 26, are rollers, J, K, and K' which are pivoted in frame $l'$, and the two pieces, $n$, which are pivoted to the frame $l'$ at the point 14, (see figs. 2, 5, 6, and 7,) and the frame $l'$ and pieces $n$, with the rollers J, K, and K', are suspended on the projecting pieces 28 of the frame A.

To the lower end of the pieces $n$ are pivoted at the points marked 21, sliding pieces $l$, which move in apertures made in the sides of the frame A, (see figs. 1 and 3.)

From each of these pieces 2 projects upward an arm, $n$, in which is pivoted a pulley, 8.

The rollers J, K, and K' are used for pressing the iron, for forming the shoe, against the sides of the dies 1 during the process of bending it, and are made operative through the medium of cams 3 on the wheels or disks $f$, located on each side of the wheels or disks R and P, all of which wheels or disks are secured in a fixed position on the shafts $l$ and $m$.

To one side of one of the pieces 26, is pivoted a jam, J', which is made operative through the medium of projections S' on the periphery of the wheels $f$, opposite to the jams J'.

The cutter 4 is secured to the jams J', and is made operative through the forward movements of the jam.

The clamps $u$ are made operative through the medium of rollers S pivoted in the arms D', which are supported in the pieces $e'$, and can be adjusted by means of screw-nuts 11 and 12, (see fig. 4.)

As the construction and arrangement of the several parts of the machine, and the relation that said parts bear to each other, will readily be understood from the foregoing description and by reference to the accompanying drawings, I will, therefore, proceed to describe the operation of the machine and its parts during the operation of forming a horseshoe.

Having the iron of the proper thickness and width for forming the horseshoe, and properly heated by a suitable furnace, or as it comes hot from the rolls, it is placed in groove 5 of the pieces 26, so that the end of the iron will press against the guide 6, secured in groove 5, (see fig. 1,) motion being imparted to the wheel B by applying power to crank $g$, it will revolve the wheel C, and with the revolving of the wheels B and C, will revolve the shafts $l$ and $m$ and the wheels secured on them. Now, the projections S' coming against the jam J', will force it and the cutter 4 forward, and thereby cut off the iron for a horseshoe. The jam J' and its cutter 4 will then drop back of their own gravity. At this point, the die 1 will be brought down on the top edge of the iron in the groove 5, and commence bending it down; and simultaneously with the bending of the iron by the die 1, the cams 3 on one side of the wheels $f$, will commence pressing against the rollers K, which will cause the rollers K' to press in toward the sides of the die 1, and at the same time the cams 3 on the outside of wheels $f$ will commence pressing against the rollers 8, pivoted in the arms $w$, and cause them and the lower ends of the pieces $n$ to move toward the sides of the machine, which will cause the rollers J, pivoted in the upper ends of the pieces $n$, to also press in toward the sides of die 1, thereby causing the iron, as it is being bent by the downward movement of the die, to be pressed close to the sides of it.

It will be observed that the projecting dies 2 on wheel P, move in harmony with the dies 1 on wheel R. The face of dies 2 pressing against the face of the dies 1 while bending the iron for the shoe, will cause them to yield to the circular form of the face of the die 2. As soon as the dies 1 and 2 and the cams 3, have passed by the rollers, and the next set of dies and cams has commenced its work for forming a shoe, then one of the four series of teeth O O' O" O''' will begin to mesh into the teeth on the sector D, and thereby carry the sector D forward, which will bring the sector B', with its grooving-die $m'$ up against the die 1, and bring the shoe in between the clamps $u$, which, coming against the rollers S, will cause them to clamp and press against the edges of the shoe while being grooved, by being pressed down on the projections S' on the face of the grooving-die $m'$. The sector D will then carry the sector B' downward, so that the arm $c'$ will shove the shoe off the grooving-die $m'$, allowing it to drop from the machine a finished shoe, at which point the teeth of the sector D will become unshipped from the teeth of the wheel B, and the spring $e$ will cause the sector D to be drawn back, so as to bring it and the sector B', and die $m'$ into position for the next shoe and next movements of the machine, and thus one shoe after another is formed by the movements of the parts, as hereinbefore described.

Having thus described the nature, construction and operation of my improvement,

What I claim as of my invention is—

1. The arrangement of the disks P and R, the several series of dies 1 and 2, the two pairs of levers $n$, the several rollers connected with said levers, and the several cams on the several wheels $f$, all arranged and operating with relation to each other, substantially as herein described, and for the purpose set forth.

2. The combination and arrangement of the clamps $u$, adjustable rollers S, with the dies $m'$ and 1, constructed, arranged, and operating with relation to each other, substantially as herein described, and for the purpose set forth.

EDWIN WASSELL.

Witnesses:
A. C. JOHNSTON,
JAMES G. THOMPSON.